April 3, 1951        C. J. LUCIA        2,547,877
BEARING SUPPORT FOR GEARS
Filed Oct. 15, 1945        2 Sheets-Sheet 1
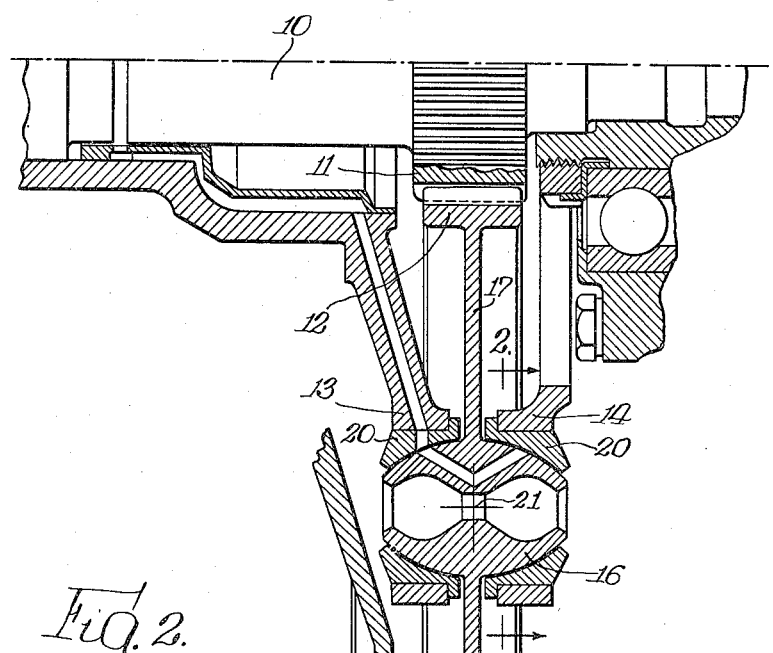
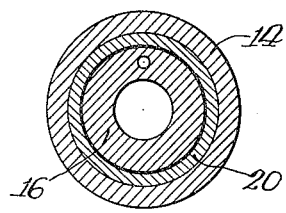
INVENTOR.
Carroll J. Lucia,
BY
Davis, Lindsey, Smith & Shonts
Atty's.

April 3, 1951 C. J. LUCIA 2,547,877
BEARING SUPPORT FOR GEARS
Filed Oct. 15, 1945 2 Sheets-Sheet 2
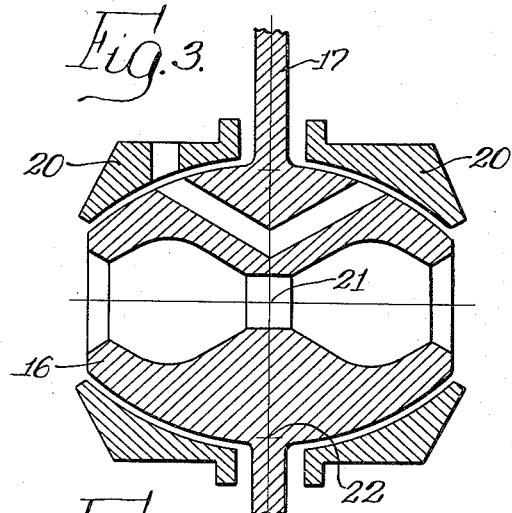
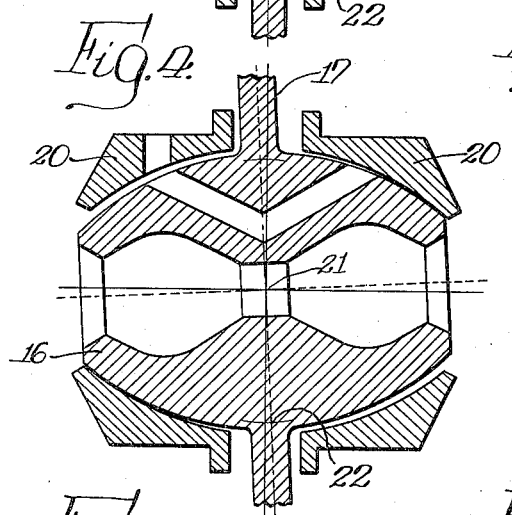
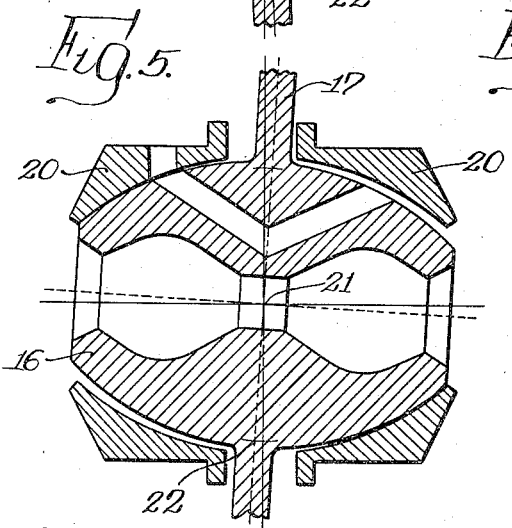
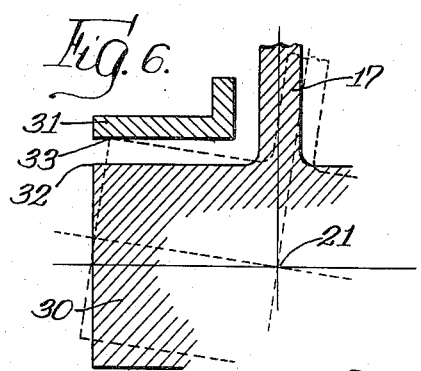
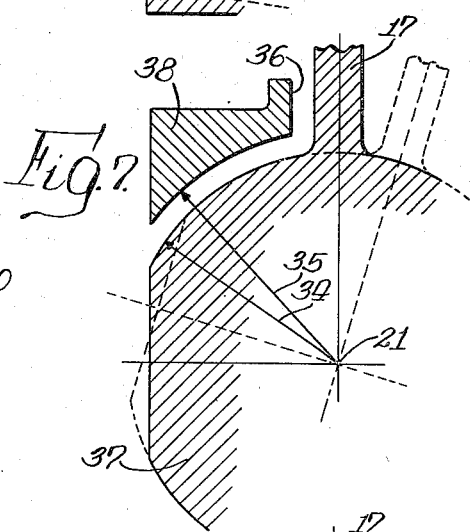
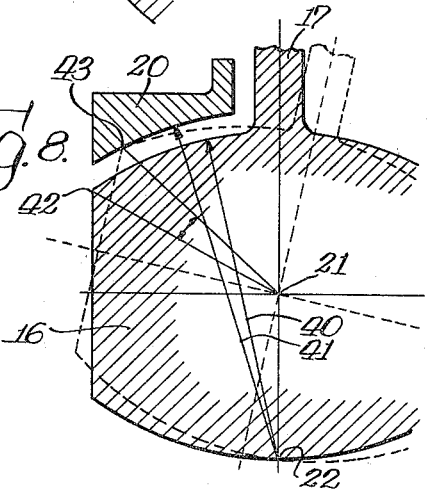
INVENTOR.
Carroll J. Lucia,
BY
Davis, Lindsey, Smith & Shonts
Atty's Patented Apr. 3, 1951

2,547,877

UNITED STATES PATENT OFFICE 2,547,877

BEARING SUPPORT FOR GEARS

Carroll J. Lucia, Toledo, Ohio, assignor to Packard Motor Car Company, Detroit, Mich., a corporation of Michigan Application October 15, 1945, Serial No. 622,329

5 Claims. (Cl. 74—801)

The invention relates generally to bearing supports and more particularly to a bearing support for a gear adapted to mesh with two or more other gears to transmit power from one to the other of said meshing gears.

The general object of the invention is to provide a novel bearing support of the foregoing character, which provides for limited shifting of the gear supported thereby to permit the gear to adjust itself, under the stresses exerted thereon by the meshing gears, to a substantially aligned relation with the meshing gears.

More specifically, it is an object to provide a novel bearing support of the foregoing character, which permits the gear supported thereby, in the event the axes of said gear and its meshing gears are slightly out of parallelism or in the event there is slightly inaccurate meshing of the gears, to shift to a limited extent in a manner tending to correct for such inaccuracies.

Another object is to provide a novel bearing support of the foregoing character, which so supports the gear as to automatically compensate for slight positional errors resulting from the manufacture or assembly of the gears.

A further object is to provide a novel bearing support of the foregoing character, which permits the gear supported thereby to shift to a limited degree so that the forces exerted thereon by the respective meshing gears and resulting from slight errors in the manufacture or assembly of the gears will be substantially balanced or equalized, thus holding such forces to a minimum.

Other objects and advantages will become apparent from the following description taken in connection with the accompanying drawings, in which:

Figure 1 is a sectional view of a gear assembly including a bearing support embodying the features of the invention.

Fig. 2 is a transverse sectional view taken on the line 2—2 of Fig. 1.

Fig. 3 is an enlarged sectional view of a portion of Fig. 1 and showing the position of the gear carried by the bearing support of the present invention, when the parts of the gear assembly are all theoretically accurate.

Fig. 4 is a view similar to Fig. 3 but showing the position of the gear when variations in manufacture and assembly within the range of tolerance are cumulative in one direction.

Fig. 5 is another view similar to Figs. 3 and 4 but showing the position of the gear when such variations are cumulative in the direction opposite to that of Fig. 4.

Fig. 6 is a diagrammatic view of an ordinary cylindrical bearing when used in place of the present bearing support.

Fig. 7 is a diagrammatic view similar to Fig. 6 but showing a spherical bearing.

Fig. 8 is a diagrammatic view similar to Figs. 6 and 7 but showing a bearing embodying the present invention.

In the production of machine parts of all nature, tolerances in dimensions and other relationships of the parts have to be allowed in order to permit manufacture in quantities on a reasonable cost basis. When such parts are assembled, the particular variations within the range of tolerance may cancel one another or may become cumulative in one or another direction.

Such a condition may obviously exist in the case of gearing where, with one gear meshing with another, the axes of the two gears may be slightly out of parallelism and the teeth may vary slightly from a theoretically correct form. Such slight variations may cause undue friction in the running of the gears. However, such variations will set up forces tending to shift one or the other of the gears toward an aligned position relative to the other gear, thereby tending to reduce the friction. Thus, by so mounting the one gear that it may shift to a limited extent under such forces, the friction may be automatically reduced.

In the case of an idler gear meshing with two other gears, there are thus two sets of forces acting on the idler gear, which may vary in direction and in magnitude, and the idler gear therefore tends to shift to an extent necessary to equalize or balance such forces. One instance of such a situation is a planetary gearing where the idler or planet gears mesh both with the sun gear and at diametrically opposite points with the outside ring or internal gear. Such planet gears are ordinarily carried on stub shafts or in a cylindrical form of bearing permitting but little self-adjustment of the planet gears.

A gear that meshes with only one other gear is necessarily rigidly secured to some other part, such as a shaft, to transmit a driving torque between such part and the other gear. The driving torque and the moments of force resulting therefrom are obviously so much greater than the forces tending to align the two gears, that the position of the one gear is substantially entirely determined by the forces arising directly from the driving torque as distinguished from the forces arising from variations within the range of tolerances.

With an idler gear meshing with two other gears, the driving torque is transmitted from one point on the periphery of the idler gear where it meshes with one gear, to another point on its periphery where it meshes with the other gear and the support for the idler gear thus is not materially affected by the driving torque. Such a condition occurs in the case of the planet gear meshing with the sun gear and the ring gear, with the additional feature of the planet gear driving its supporting spider or cage about the axis of the sun gear. However, in so driving the spider, there is no torque applied to the spider about the axis of the planet gear. The planet gear may therefore be provided with a mounting or support which permits the gear to shift under the influence of the forces tending to align the gear, so far as possible, with its meshing gears.

The present invention provides a bearing support for an idler gear such as a planet gear, which permits sufficient self-adjustment of the idler gear to align itself with its meshing gears or at least to reduce the misalignment to a minimum with a balanced or equalized condition existing as to the relation between the idler gear and the respective meshing gears. The self-adjustment permitted by the bearing support is limited in extent so that undue freedom of movement of the planet gear is not permitted, and the forces acting on the planet gear cannot therefore cause the gear to shift beyond the desired position. The shifting occurs within the slight clearance normally allowed for an oil film on the bearing surface, so that no excessive clearance need be provided, and effective lubrication of the bearing surfaces may be provided for.

To illustrate the invention, I have shown fragmentarily in Fig. 1 a planetary gearing in which the planet gear is carried by a bearing support embodying the invention. Thus, a central shaft 10 is provided with a sun gear 11, and the latter meshes with a planet gear 12 carried by a spider or cage which, in the present instance, comprises two parts 13 and 14 jointly supporting the planet gear 12. The planet gear 12 also meshes with a ring or internal gear 15. In the form illustrated, the planet gear 12 is provided with a central hub 16 preferably hollow and projecting equally from opposite sides of the web portion 17 of the gear. The hub 16 is mounted in a bearing support comprising a pair of bushings 20 respectively carried by the two parts 13 and 14 of the spider or cage, and preferably press fitted therein.

Heretofore, such bushings and the hub of the gear have been provided with cylindrical bearing surfaces (to be discussed in more detail hereinafter in connection with Fig. 6) with a slight clearance therebetween to allow for an oil film. Such clearance is obviously so small in radial dimension that it permits of practically no shifting of the gear to correct any misalignment with the gears 11 and 15. If the bearing surfaces on the bushings and hub were spherical in form (similarly to be discussed in connection with Fig. 7) about the point (indicated at 21) where the mid-plane of the planet gear intersects the axis of the gear, the shifting movement of the gear would be unlimited except by the web portion 17 abutting the bearing bushings, since the forces tending to cause such shifting movement act at opposite points on the periphery of the gear and thus are centered about the point 21.

The present bearing support permits a limited shifting movement of the planet gear 12 of sufficient range to correct such misalignments as would result from tolerances in manufacture of the various parts and assembly thereof. To this end, the coacting bearing surfaces of the bushings 20 and the hub 16, which are complementary, have a form which may be generally described as barrel-shaped and have only the usual radial clearance for an oil film. Thus, each of these bearing surfaces is smaller in diameter at the ends of the hub than at the mid-plane of the gear. Since the hub projects equally at opposite sides of such mid-plane, the bearing surfaces are symmetrical relative to said plane.

In the preferred form, the bearing surfaces are spheroidal and the contour in any axial plane is arcuate about a center laterally spaced from the axis. Thus, in the present instance, as shown in Figs. 3, 4 and 5, such contour is arcuate about a center 22 located at the opposite side of the axis from such contour and substantially on the opposite contour in the same axial plane where said opposite contour intersects the mid-plane of the gear. The radius of the arc of such contour is thus substantially equal to the maximum diameter of the hub. The bearing surfaces, of course, are surfaces of revolution to permit rotation of the gear.

The character of the shifting movement of the planet gear will be apparent from a comparison of Figs. 3, 4 and 5. In Fig. 3, the gear 12 is shown in the position it occupies when the parts of the gear assembly all are of theoretical accuracy or when the forces acting on the planet gear and arising from its relation with the respective gears 11 and 15 are equal. In this instance, the oil clearance between the bushings 20 and the hub 16 is uniform at all points. In Figs. 4 and 5, the planet gear 12 is shown in its maximum shifted positions where the cumulative effect of such forces causes the gear 12 to shift in one direction or the other so that the axis of the gear 12 intersects the axis of the bushings 20 at a small angle. The extent of shifting is limited by the amount of clearance provided, the corners or edges of the hub 16 at its outer ends engaging the bearing surfaces of the bushings 20 at opposite sides, and the clearance on each side of the axis of the support and gear tapering from a maximum of substantially double the normal amount of clearance at one side of one end of the bearing to substantially zero as the minimum at the same side but, on the other end, the clearance on the opposite side, of course, tapering oppositely. Thus, an oil film will exist in such clearance, although it varies in thickness in accordance with the tapering form of the clearance.

From a consideration of Figs. 6, 7 and 8, the reason why a suitable shifting movement is provided will be evident. Thus, in Fig. 6, an ordinary cylindrical bearing is diagrammatically shown, the clearance, of course, being greatly exaggerated, as is the case also in Figs. 7 and 8. In Fig. 6, the hub of the gear, which is cylindrical, is shown at 30 while one of the bearing bushings is shown at 31. The amount of shifting movement of the gear is, of course, determined by the amount of clearance since the outer corner or edge of the hub 30, indicated at 32, can move only to point 33 where it abuts the bearing surface of the bushing 31. Such movement in an actual construction is, of course, extremely small and almost negligible because the clearance is small and the movement of the corner or edge 32 is only slightly greater than the radial clearance between the hub 30 and bushing 31. Thus, with a cylindrical bearing, the gear cannot adjust itself to a sufficient extent.

In the case of a bearing having bearing surfaces which are spherical about the intersection of the axis with the mid-plane of the gear, namely, the point 21 (the radii to the bearing surfaces being indicated at 34 and 35), as shown in Fig. 7, the clearance provides no limitation to the shifting movement of the gear since all points on the bearing surface of the hub, indicated at 37, move parallel to the bearing surface on the bearing bushing, shown at 38, and thus will never abut such surface to limit the movement. The only limitation to shifting movement of the gear is afforded by abutment of the web portion 17 of the gear with the adjacent faces 36 of the bushings or at some other point in the assembly. The spacing between the web portion 17 and the faces 36 is, for other reasons, far greater than that desired for shifting movement of the gear and thus is not feasible to use as a limiting factor.

In Fig. 8, a bearing embodying the present invention is shown, where the bearing surfaces of the hub 16 and bearing bushing 20 are arcuate about the center 22 as indicated by the radial arrows 40 and 41. With such construction, shifting movement of the gear will cause the outer corner or edge, indicated at 42, to swing upwardly (as shown in this figure). The swinging or shifting movement of the gear will be limited by abutment of the corner or edge 42 with the bearing surface of the bushing 20, as shown at 43, but such shifting movement is obviously much greater than in the case of the cylindrical bearing of Fig. 6, because the bearing surface of the bushing 20 curves away or upwardly in Fig. 8. The planet gear 12 thus may shift a substantial amount to align itself with the gears 11 and 15, with the shifting movement limited by the abutment described. Obviously the closer the center 22 of the curvature of the bearing surfaces is to the point 21, the greater is the movement permitted, since the bearing surfaces thereby approach a truly spherical form.

From the foregoing it will be apparent that I have provided a novel form of bearing support for an idler gear, such as a planet gear in a planetary system, which provides for self-alignment of the idler gear with its meshing gears. The shifting movement permitted is sufficient to allow for the cumulative effects of tolerances in manufacture of the parts and assembly thereof, but yet is limited to a range which is suitable for such purposes and will not permit an unduly large shifting of the gear.

I claim:

1. In a planetary gearing unit, a sun gear, an orbit gear, a planet pinion, and a carrier for said planet pinion, said planet pinion having a hub, and a bearing in said carrier to receive said hub, said bearing and hub having complementary barrel-shaped bearing surfaces with clearance therebetween, each of said surfaces having a contour in an axial plane, which is arcuate about a center spaced from the axis of the surface, said bearing and hub being so arranged as to cause a substantially equal distribution of tooth pressure throughout the full width of the meshing teeth of said planet pinion with both said sun gear and said orbit gear.

2. In a planetary gearing unit, a sun gear, an orbit gear, a planet pinion, and a carrier for said planet pinion, said planet pinion having a hub, and a bearing in said carrier to receive said hub, said bearing and hub having coacting complementary bearing surfaces with clearance therebetween, said surfaces being surfaces of revolution about the axes of said hub and said bearing respectively, each surface having a contour in an axial plane which is circular about a center spaced from the axis, said bearing and hub being so arranged as to cause a substantially equal distribution of tooth pressure throughout the full width of the meshing teeth of said planet pinion with both said sun gear and said orbit gear.

3. In a planetary gearing unit, a sun gear, an orbit gear, a planet pinion, and a carrier for said planet pinion, said planet pinion having a hub, and a bearing in said carrier to receive said hub, said bearing and hub having coacting complementary bearing surfaces with clearance therebetween, each of said surfaces having a contour which is curved in an axial plane to permit rocking movement of said planet pinion relative to said carrier and being non-spherical to limit the extent of rocking movement, said bearing and hub being so arranged as to cause a substantially equal distribution of tooth pressure throughout the full width of the meshing teeth of said planet pinion with both said sun gear and said orbit gear.

4. In a planetary bearing unit, a gun gear, an orbit gear, a planet pinion, and a carrier for said planet pinion, said planet pinion having a hub, and a bearing in said carrier to receive said hub, said bearing and hub having coacting complementary bearing surfaces with clearance therebetween, each of said surfaces having a contour in an axial plane at each side of the axis, which is circular about a center lying substantially on the contour at the opposite side of the axis, said bearing and hub being so arranged as to cause a substantially equal distribution of tooth pressure throughout the full width of the meshing teeth of said planet pinion with both said sun gear and said orbit gear.

5. In a planetary gearing unit, a gun gear, an orbit gear, a planet pinion, and a carrier for said planet pinion, said planet pinion having a hub, and a bearing in said carrier to receive said hub, said bearing and hub having coacting complementary bearing surfaces with clearance therebetween, each of said surfaces decreasing in diameter toward its ends and having a contour in an axial plane, which is curved about a center spaced from the axis and equidistant from the ends of the surface, said bearing and hub being so arranged as to cause a substantially equal distribution of tooth pressure throughout the full width of the meshing teeth of said planet pinion with both said sun gear and said orbit gear.

CARROLL J. LUCIA.

REFERENCES CITED

The following references are of record in the file of this patent:

UNITED STATES PATENTS

| Number | Name | Date |
| --- | --- | --- |
| 626,142 | Clay | May 30, 1899 |
| 1,950,971 | Chilton | Mar. 13, 1934 |
| 2,032,466 | Buckwalter | Mar. 3, 1936 |
| 2,127,463 | Chilton | Aug. 16, 1938 |
| 2,144,937 | Ryder | Jan. 24, 1939 |
| 2,281,875 | Gleissner | May 5, 1942 |

FOREIGN PATENTS

| Number | Country | Date |
| --- | --- | --- |
| 16,616 | Great Britain | Dec. 18, 1884 |